INVENTOR
Edward E. Colby

BY Watson, Cole, Grindle + Watson
ATTORNEY

Jan. 26, 1965     E. E. COLBY     3,167,432
SLURRY TREATMENT OF FLOUR WITH PROTEOLYTIC ENZYMES AND
DRY MIXES UTILIZING THE RESULTING FLOUR
Filed May 7, 1962     2 Sheets-Sheet 2
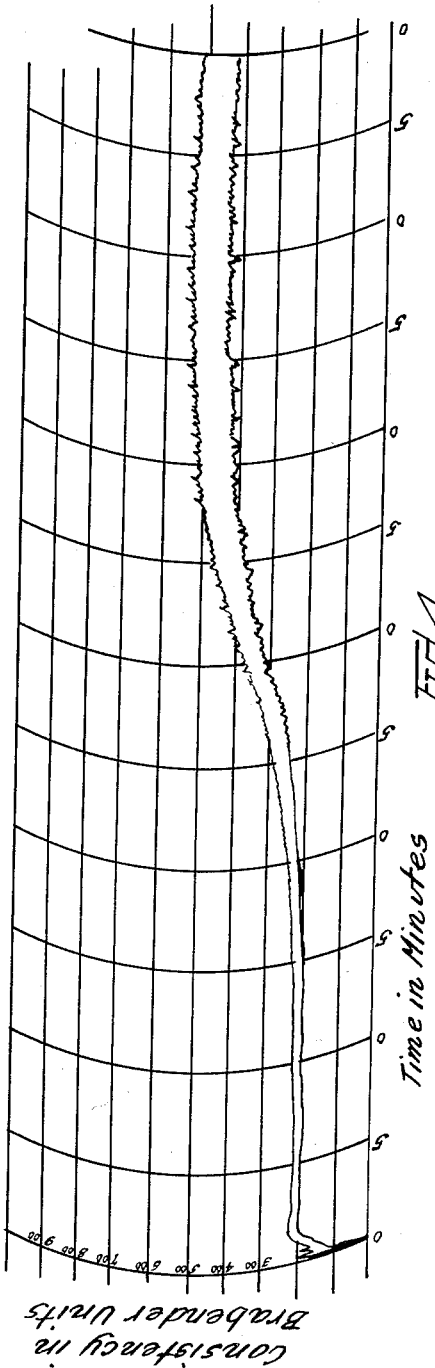
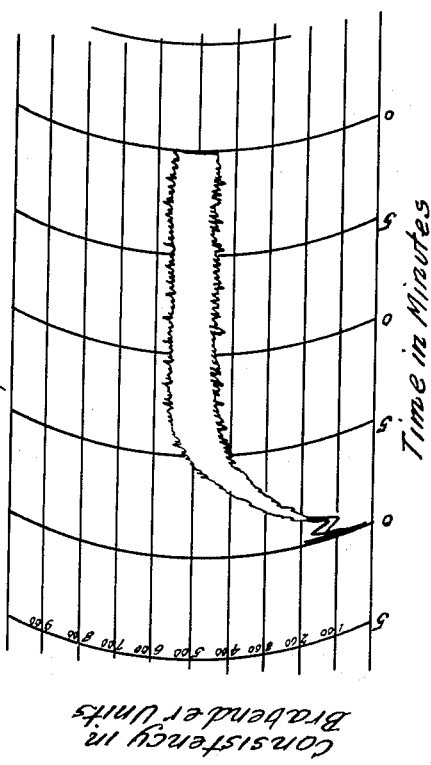
INVENTOR
*Edward E. Colby*
BY *Watson, Cole, Grindle & Watson*
ATTORNEY

United States Patent Office 3,167,432
Patented Jan. 26, 1965

3,167,432
SLURRY TREATMENT OF FLOUR WITH PROTEO-
LYTIC ENZYMES AND DRY MIXES UTILIZING
THE RESULTING FLOUR
Edward E. Colby, Cincinnati, Ohio, assignor to The
Procter & Gamble Company, Cincinnati, Ohio, a cor-
poration of Ohio
Filed May 7, 1962, Ser. No. 192,794
6 Claims. (Cl. 99—93)

This invention relates to the treatment of flour and is directed, more particularly, to a process of treating flour to substantially reduce its development time during mixing to form dough, as well as to a prepared dry culinary mix containing the treated flour.

There has been an increasing demand among consumers for prepared dry mixes which are packaged for distribution and sale through retail outlets to the homemaker, who with a few simple steps can produce a freshly baked product in the home. Usually, the homemaker adds a specified amount of aqueous fluid, e.g., milk or water, to the contents of the package, mixes thoroughly to obtain a dough or batter, and bakes the same in a container according to instructions.

Bakery goods of the class traditionally leavened with yeast, such as bread, rolls, sweet breads, sweet rolls and the like, which will be referred to herein as "bread-type goods," normally require a strong, elastic dough capable of retaining to a satisfactory degree the gas bubbles evolved during the leavening process and of providing the volume, grain, texture and body desired in such goods. A strong, elastic dough, in turn, requires a hard wheat flour containing at least about 10.5% protein, as is milled from hard winter or hard spring wheat in contrast to a soft wheat flour, such as is used in making cakes, cookies and biscuits where tenderness and crumbliness are sought. At the same time, however, it must be realized that the selection of a hard wheat flour does not alone result in a strong, elastic dough since the type and extent of mixing also affect to a large degree the nature of the resultant dough.

The phenomenon by which a loose mass of flour particles is converted by means of a watery fluid to a cohesive, resilient body of dough is known in the art as "development." Wheat flour is uniquely characterized by the presence of a significant proportion of gluten, which is thought to exist in the initial flour in the form of randomly arranged particles or nodules. When exposed to water, these particles hydrate and if then subjected to mixing, tend to elongate into chains or strands. As mixing continues, the strands are repeatedly stretched and relaxed, becoming re-oriented into a parallel arrangement, and producing a tough or strong matrix for the starch particles which is well adapted to entrap and retain gas bubbles, including those of air introduced during mixing as well as of carbon dioxide created as a result of leavening.

The mechanism of gluten development is not completely understood; at best, the above description is undoubtedly over simplified. It will be sufficient, however, to explain why a substantial amount of work must be applied to the dough mass if the desired condition of development is to be achieved. For example, in a commercial bakery manufacturing bread by a batch process, mixing in a powerful sigma-blade kneader for 10–15 minutes is common practice. A mixing step of such length poses no great problem for a commercial baker who has available the necessary equipment to accomplish it mechanically.

A housewife, on the other hand, lacks this advantage, since home mixers are unsuited for kneading dough both with respect to power capacity and requisite mixing action, and must resort to the tedious and tiresome hand methods. As a consequence, homemade bread-type goods frequently show by their poor quality the results of insufficient gluten development due to inadequate mixing even though the flour ordinarily used in the home is weaker than commercial flours.

It will thus be appreciated that in the case of dry mixes for bread-type goods intended for preparation into dough in the home, there is a need for substantial reduction in the amount of work required to make the mix into a satisfactory dough. The primary object of this invention is the modification of a hard wheat flour of the kind used in bread-type goods in such a way as to lessen the time and work necessary for adequate gluten development during the dough preparation step in the absence of excessive degradation of the beneficial properties of the flour, with a view to the ultimate goal of an "instant dry mix" which can be made into dough and baked with maximum ease and speed.

As an incident to this ultimate goal, the present invention contemplates the application of the modified hard wheat flour to a chemically leavened dry mix and imposes the further criterion that the flour shall exhibit reduced development in the presence of a chemical leavening system. Obviously, if the dough must be allowed to rise for periods of several hours, as is essential for yeast-leavened goods, the goal of an instant dry mix remains unachieved even though the mixing time might be drastically reduced. As is well known, chemical leavening systems are effective without a lengthy waiting period for rising to take place. In the past, however, results obtained by substituting chemical leavening agents for yeast in bread-type formulations have been discouraging. This can be explained by the fact that the long development time of an ordinary bread-type dough is incompatible with the fast response of the chemical leavening, so that by the time the dough has been properly developed, the leavening action has been substantially dissipated. Moreover, chemical leavening has a distinct retarding effect on gluten development. Thus, if a conventional chemical leavening system is added to ordinary flour which is then made into dough in the usual way, mixing in the order of 40 minutes is needed to attain proper development and, by this time, much of the carbon dioxide produced by the reaction in the presence of water of the chemical leavening system has been lost. Nor does the solution reside in merely cutting short the mixing time. If the same formulation is mixed for only five minutes, the dough is sticky and hard to handle, and when baked, produces a product having a tender, crumbly cake-like structure.

It has been found that hard flour modified by the present process is peculiarly adapted for association with a chemical leavening system in a prepared dry mix for bread-type goods in that the development time of the modified flour is sufficiently short to be fully compatible with many of the chemical leavening systems known in the art. This discovery is the basis of another object of the invention, viz., a prepared dry mix comprising a chemical leavening system and a hard wheat flour, which flour is characterized by a development time in the presence of chemical leavening agents of not more than about ten minutes and preferably about six minutes or less.

The active substance used in the present process to modify the flour is a proteolytic enzyme, such as is derived from papaya fruit or fungal sources, especially *Aspergillus oryzae*. Such enzymes have been previously employed in the art as dough additives, functioning to "condition" or "mellow" the dough by breaking down the flour proteins so as to improve its handling or machining quality (U.S. Patents 2,197,784 and 2,303,448; Matz, Bakery Technology and Engineering, The Avi Publishing Co., Inc., 1960, pages 232, 233). The effect upon the mixing or development time of the resultant dough, however, is very slight in practice, especially where leavening is effected chemically. For example, a conditioned dough may exhibit a reduction in mixing time of only two or three minutes. Also, the action of the enzyme on a system as complex as dough is difficult to regulate or control. In addition, certain ingredients common to doughs, notably salt, strongly inhibit the action of proteolytic enzyme.

A further object of the invention is a process for subjecting hard wheat flour to the action of a proteolytic enzyme under conditions much more readily subject to control than is possible with a dough and in a state from which the flour can be recovered in substantially its original form for further use as desired.

These and other objects and advantages will become apparent from the following description when read in conjunction with the accompanying drawings, in which:

FIG. 3 is another farinogram indicating the development characteristics of untreated hard wheat flour in a chemically-leavened dough prepared from ingredients, exclusive of shortening, commonly employed for making rolls and showing the effect of the chemical leavening upon the development of the dough;

FIG. 4 is a farinogram obtained with a dough identical to that tested in connection with FIG. 3 but containing treated flour, showing the drastically reduced development characteristics of the treated flour under the same conditions.

Figure 1:
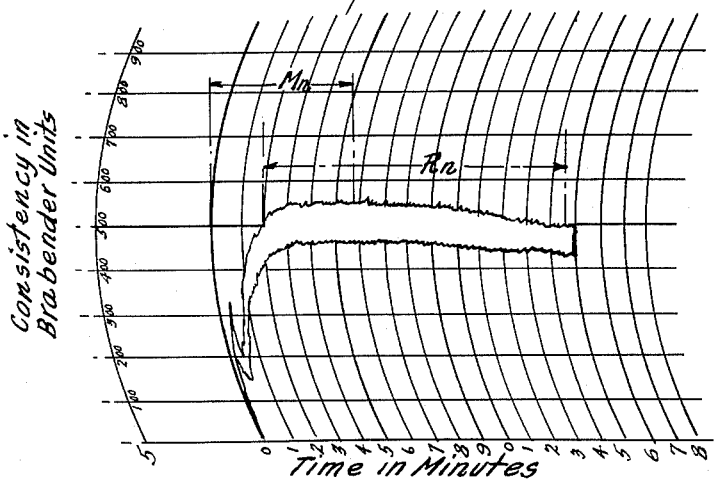
FIG. 1 is a reproduction of a farinogram indicating the development characteristics of typical untreated hard wheat flour admixed with water only to make a dough.

In general, the process of this invention contemplates the steps of treating hard wheat flour in the form of a slurry or water suspension with proteolytic enzyme, for a given period of time, preferably accompanied by agitation, and drying the flour-water slurry under conditions avoiding degradation of the flour components to restore the flour to substantially its original particulate form. The flour so treated can be employed in lieu of normal flour in dry mixes for various bread-type products, preferably leavened by a chemical leavening system. Doughs prepared from treated flour, water and chemical leavening will exhibit a development time of not more than about ten minutes in distinct contrast to a similar dough containing untreated flour which requires forty minutes or more mixing time to achieve the same extent of development. Goods baked from dry mixes containing treated flour and chemical leavening, while not necessarily equaling a comparable freshly-prepared yeast-leavened product in all desirable respects, notably flavor, display good volume and moderate crumb elasticity and are generally acceptable whereas goods baked from similar mixes containing untreated flour are flat and dense, with virtually no change in volume during baking.

The apparent effect of the enzyme treatment is to partially break down or depolymerize the protein chains of the flour gluten. There is an optimum degree to which this should be done. If the treatment time is too short, little if any advantage is to be gained as the mixing time required to develop the gluten will be approximately the same as for untreated flour. On the other hand, if the treatment is prolonged unduly, the gluten becomes too weak to retain the carbon dioxide produced by the chemical leavening system and the baked product produced therefrom will have very uneven cell structure with many large cells and tunnels.

The process of this invention is limited to the use of hard wheat flour, having a protein content of at least 10.5% by weight and preferably somewhat higher, say at least 12%. Soft wheat, which does not give satisfactory results for purposes of the present invention, normally has a lower protein content than 10.5%, and, for convenience, this minimum value is employed herein as the distinguishing characteristic of a hard wheat flour. For most satisfactory results, the flour selected before treatment should have a development curve, as shown by a farinogram, matching as closely as possible the curve of FIG. 1. In other respects, flour should be of the grade and quality ordinarily used for the particular product in mind as is obtainable from regular commercial sources. An extensive number of hard wheat flours regularly sold for the manufacture of the class of goods in question have been examined in connection with the present invention with more or less equivalent results.

The hard wheat flour is suspended in water to form a slurry having a weight ratio of flour to water within the range of about 1:1.5–1:4. A preferred ratio of flour to water is about 1:2. A larger excess of water, while permissible, is uneconomical since the water ultimately must be removed during drying. When the amount of water in the slurry is significantly below the minimum ratio specified above, the development of gluten in the flour tends to take place in the mixing tank for the slurry, and when the product is dried it will contain long strands of developed gluten which tend to be undesirable when the flour is prepared into dough and baked. This problem is not encountered in the case of the addition of excess water.

Enzymes useful in the bakery art are generally classified as either proteolytic or amylolytic. A proteolytic enzyme attacks or breaks down proteins in contrast to an amylolytic enzyme which attacks or breaks down starches. The use of a proteolytic enzyme is a necessary feature of this invention. However, mixtures of proteolytic and amylolytic enzymes also give satisfactory results. In fact, the added presence of amylolytic enzymes is beneficial in promoting good color in the baked product. Examples of specific proteolytic enzymes are papain, pepsin, ficin and bromelin. Examples of mixtures of proteolytic and amylolytic enzymes are the commercial products "Fermex MT," a mixture of enzymes high in both proteolytic and amylolytic activity derived from the fungus *Aspergillus oryzae*, and "Rhozyme-A-4," a group of purified proteolytic and amylolytic enzymes of fungal origin, probably *Aspergillus oryzae*. As employed herein, "Fermex MT" exhibited a proteolytic activity of 42,000 hemoglobin units per 3.66 gm. tablet or 2 oz. dry powders, hemoglobin units being a standard basis for expressing such activity.

Precise delineation of the permissible range of amounts of the enzyme in terms of weight is rather difficult. This follows primarily from the fact that a definite correlation between activity and weight does not necessarily exist. The activity rating is quite dependent upon the degree of purity of a particular preparation and commercial products can and do vary rather widely in purity. Moreover, a high degree of dilution by means of inert fillers is commonplace. Under these circumstances, it is more realistic to define the amount of enzyme in terms of the desired result upon the flour, as will be hereinafter described. Certainly, the amount of active enzyme need be only quite small compared to the flour. It is believed that as little as about 0.0001% of active enzyme by weight of the flour of normal moisture content as supplied by the miller is entirely sufficient and perhaps as much as 1.0% or more would not be excessive. The extent of attack is dependent, in addition to the amount of enzyme, upon the duration of exposure of flour to the enzyme and the prevailing temperature, and the ultimate result upon the flour may be altered by variation in these conditions as well as in the amount of enzyme. It has been accepted for many years that enzymes are, in effect, biological catalysts, functioning analogously to other catalysts for chemical reaction, except that they are much more specific and respond less predictably to variations in the system wherein activity is exerted. With this in mind, the term "catalytic amount" is a simple and helpful general definition of the quantity of enzyme to be employed for present purposes.

Enzymatic activity increases with increasing temperature until the particular denaturization or inactivation point of the enzyme is reached, which is for most enzymes around 170°–180° F. This being the case, the temperature and the time of treatment of the flour will vary inversely. Thus, for a given amount of enzymes, a treatment time of 3–4 hours would be permissible at a temperature of 80–90° F., while a time of 30 minutes might well be used if the slurry temperature were 130° F. It is known that the starch of flour is subject to gelatinization in the presence of large amounts of water, as obtained in the present slurries, at relatively low temperatures. While the exact combination of time and temperature at which this condition becomes serious may vary from flour to flour, in general, no difficulty should be encountered if the slurry temperature is not allowed to materially exceed about 130° F. The preferred range of slurry temperature is about 100–120° F. and of mixing time, 2.5–1 hours. Desirably, the slurry is maintained under mild agitation during the enzyme treatment so that the flour is not allowed to settle and is affected as uniformly as possible.

After the desired end point for the slurry has been reached, the slurry is dried. Various methods of drying materials of high water content are known in the art, such as freeze-drying, vacuum-drying, spray-drying, drum-drying, tray-drying, film-drying and the like, and so far as can be determined, any of these can be adapted to provide a combination of temperature, time and pressure suitable for drying the present slurries. For several reasons, mostly of a practical nature, the further discussion of this aspect of the invention will be essentially confined to spray-drying. Spray-drying combines efficient and economical operation with relatively temperate conditions as regards the risk of heat degradation of the flour and is the most likely choice for commercial practice of the invention. Moreover, the product of spray-drying closely resembles the original powdery state of flour and is suitable for immediate use in formulating culinary products without further processing. The emphasis given spray-drying here, however, should not be taken as an implication that other methods could not be used. Care needs to be exercised in the selection of the drying conditions to avoid excessively high drying temperatures which might heat-damage the flour. In all the drying processes, the temperature of the product being dried remains constant so long as water is present. Hence, the temperature of the drying air in spray-drying at the inlet of the drier is not critical and can be any value consistent with standard spray-drying technology. Thus, the inlet air temperature can range from 200 to 600° F., one satisfactory temperature being about 350° F. As the particles of flour achieve substantial dryness, their temperature begins to rise and it is the maximum temperature achieved prior to discharge that determines whether or not heat-damage occurs. Because of the nature of spray-drying, it is often impossible to measure precisely the maximum temperature reached by the flour during this phase of the process. This is particularly true when cooling air is introduced into the lower end of the tower since this air imposes an artificial limit on the exhaust air temperature and masks the actual maximum temperature. In the absence of cooling air, the product outlet temperature and the exhaust air temperature are in substantial equilibrium, the latter, thus, representing the theoretical maximum temperature to which the flour is subjected. Operating without cooling air, exhaust air temperatures of more than about 170° F. have been used without evidence of excessive heat damage. In the final analysis, the performance of the flour is the true test and if the performance indicates that heat damage has occurred, which will be apparent to one skilled in the art, then subsequent drying should be carried out under somewhat less severe conditions.

The following is a specific example of the process of this invention: 40 pounds of a hard red winter wheat flour sold under the trade name "Eaco," containing 12.5% protein and 12.0% moisture as sold, was mixed with 60 pounds of water and one tablet (3.66 grams) of Fermex MT and gently agitated in a mixing tank for about one hour at 110° F. The slurry was then homogenized in a Manton-Gaulin high pressure triplex pump, equipped with a homogenizing valve, at 3000 p.s.i. and delivered under this pressure to a conventional concurrent hot air spray-drying tower. The spray dryer had an air inlet temperature of 480° F., an air outlet temperature of 178° F., and a flow rate of 2.64 pounds slurry/minute. The appearance of the dry treated flour closely resembled the initially untreated flour.

The optimum proportions of flour and enzyme necessary to partially break down the gluten and to produce the desired development time in the dough can best be determined by testing the behavior of the treated flour under actual dough-making conditions. This may be accomplished by means of a special dough-mixing machine coupled to a recording dynamometer. One such device which is available commercially and in common use in the bakery art is the farinograph. This instrument consists of a water-jacketed mixing chamber in which is disposed two helical spiral blades, a constant speed synchronous motor driving the blades, a dynamometer for measuring the torque on the blades, and a continuous recorder for registering the blade torque. The resistance offered to movement of the mixing blade by a dough being mixed within the chamber is recorded by an ink stylus on a moving chart calibrated on the vertical scale in terms of so-called Brabender units and on the horizontal scale in terms of time. The chart is divided vertically into ten equal divisions, each of which is assigned a value of 100 units. These units are calibrated in terms of meter-grams of force and provide a reproducible measure of dough strength or resistance which is universally accepted as such in the baking art. It is obvious that there is little resistance when mixing is initiated; as the dough develops, however, its plasticity will decrease, increasing the resistance to rotation of the mixing blades and causing the motor to supply a greater torque to the blades to maintain a constant speed, the change in torque being continuously recorded on the chart. At some point, the dough will reach maximum strength or gluten development, which will appear as a peak, usually of a gradual nature, on the chart. At this point, the dough is considered to be in best condition for use. If mixing is continued beyond this point, the resistance of the dough decreases as the gluten begins to break down, and the torque curve drops off from its peak.

On the basis of experience, a level of 500 Brabender units has been accepted as the optimum consistency for a dough. The water absorption characteristics of flours vary significantly and in order to eliminate this variable, the established procedure from farinograph tests calls for the addition to the flour sample of an amount of water sufficient to cause the development curve at its peak coincident with maximum development of the sample to center on the 500 unit line of the chart. This amount for a given sample is determined by trial and error in advance of the actual test which is to be examined. By adjusting the quantity of water to give a constant maximum, a meaningful comparison of the curves of all types of flours is possible.

From what has just been said, it will be seen that the farinograph is especially well adapted for the determination of the effect upon the flour of the treatment of the present invention and the suitability of the treated flour in the ultimate dry mix. Indeed, this is virtually the only available analytical instrument that is useful for this purpose. Accordingly, the characteristics of treated flours which qualify for use in dry mixes for bread-type products needing minimum mixing in dough preparation are both best understood and best defined in terms of the behavior of the flour in the farinograph as appears from its farinogram or development curve.

In the accompanying drawings are reproduced four actual farinograms which will serve to illustrate the effect of the present process upon the behavior of the flour during dough-making both with and without chemical leavening. These farinograms were obtained from tests on the farinograph performed according to the established procedure for the instrument as summarized above. The reproductions duplicate the originals as closely as is possible, except only the extreme limits of the strokes of the recording pen have been shown to avoid a solid black band which is not permitted by the standards applied to patent drawings. The general configuration of the bands, however, has been carefully preserved.

Figure 2:
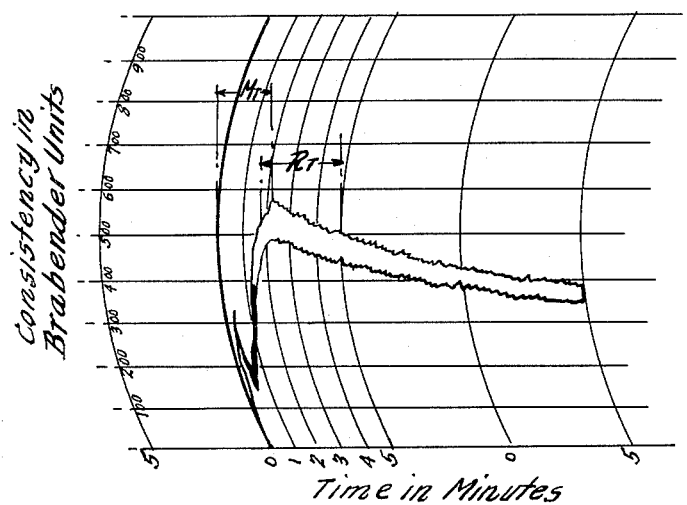
FIG. 2 is a farinogram similar to FIG. 1 indicating the development characteristics under the same conditions of the same flour but treated according to the process of this invention.

FIGS. 1 and 2 provide a comparison of the flour (10.1% moisture content) treated in accordance with the processing example already described with the original untreated flour, the former having an absorption value of 0.98 gram water/gm. flour and the latter, 0.89 gm. water/gm. flour to adjust the development curves to coincide with the 500 unit line at maximum development. The curve for the normal flour (FIG. 1) is generally typical of a hard wheat flour and, in fact, is recommended as a standard for purposes of the selection of flour for use in the present invention. From FIG. 1, it can be seen that the normal flour required about 5–6 minutes to reach peak development. This period is referred to as the "mixing time" and is indicated on the farinogram by the distance $M_n$, the letter M being commonly assigned to this value in farinograph testing with the subscript $n$ being applied here to designate normal flour. The time between the points at which the curve first and last touched the 500 unit line is the mixing tolerance and is indicated by the distance $R_n$, R being the usual designation for this value and $n$ having the same significance as a subscript as before. In FIG. 1, $R_n$ equals about 12.5 minutes. For hard wheat flours generally, M usually will equal to at least about 5 minutes and R usually will exceed 10 minutes.

The difference between the curves of the normal flour and the treated flour are notable, especially as to the characteristics of mixing time and mixing tolerance. As appears in FIG. 2, the mixing time for the treated flour, $M_t$, was about 2¼ minutes and the mixing tolerance, $R_t$, about 3¾ minutes. Thus, it can be concluded that the treatment of the invention drastically shortened the development time of the flour as well as the period of optimum usefulness of the dough. All hard flours so treated do not correspond exactly to these specific values; some latitude is, of course, to be expected. Thus, it can be generalized on the basis of experience acquired in the development of the present concept that the treated flour should, when formed into dough by the addition of water alone, have a mixing time about 1.5–5 minutes and a maximum tolerance of about 5 minutes.

The difference in flour behavior attributable to the process of the invention is even more strikingly revealed by the curves produced when the dough being tested includes a chemical leavening system. FIGS. 3 and 4 compare the results of testing the same flours used for FIGS. 1 and 2 but in the presence of chemical leavening. For the tests of FIGS. 3 and 4, basic mixes were prepared with the treated and untreated flour as follows.

| Ingredient: | Parts by weight |
|---|---|
| Flour | 100 |
| Salt | 1.5 |
| Sugar | 15 |
| Dried non-fat milk solids | 7 |
| Dried whole eggs | 2 |
| Leavening [a] | 9 |

[a] The leavening was a commercial baking powder sold under the name Clabber Girl having the following composition: sodium bicarbonate 32%, monocalcium phosphate monohydrate 13%, sodium aluminum sulfate 22%, and starch as filler 30%.

In the case of the regular flour mix, 180 gms. water were added to 336 gms. mix in the farinograph mixing chamber, while in the case of the treated flour mix, 212 gms. water were added to 313 gms. mix, these amounts of water being required for 500 unit development, and the apparatus was operated for the period indicated by the farinograms.

As shown in FIG. 3, the dough prepared from untreated flour needed 45 minutes of mixing to achieve an average development equal to 500 Brabender units whereas the dough containing treated flour as shown in FIG. 4, achieved such development after about 7 minutes of mixing. By the term "average development" as used here is meant the point at which the median or center line of the farinogram band first coincided with the 500 unit line of the chart. Theoretically, this should coincide with peak development but since the latter may vary slightly and often persists for some time, the term "average development" is employed for greater precision. In general, chemically leavened doughs of the invention need not more than about 10 minutes of mixing to achieve 500 unit average development.

To illustrate the performance of the flour treated as described above in an actual product, another 313 gm. sample of the treated flour mix above was mixed with 212 cc. water with the farinograph mixing section for 5 minutes, after which 50 gm. of an emulsified shortening [1] were added and mixing continued for an additional minute. The resultant dough had good handling qualities. Roll-sized portions (42 grams.) of the dough were taken and baked for 30 minutes at 375° F., giving a reasonably well-textured product of satisfactory roll-like configuraton. No volume measurement was taken.

In some of the examples, farinograph testing was carried out on the dough formulation exclusive of shortening. This was done purely for convenience and is not believed to affect significantly the test results since in other cases, the shortening was included without materially altered development curves.

It is immaterial whether the treated flour sample is subjected to a farinograph test in admixture with water alone or in the added presence of a chemical leavening system and other ingredients to determine if the batch from which the sample is taken is in favorable condition for use in the present "instant" dry mixes, provided one bears in mind that the criteria are not the same. On the one hand, the simple mixture gives the most direct indication of the effect of the enzyme treatment free of other influences. On the other hand, the addition of chemical leavening tends to magnify the effect of insufficient treatment and best reveals the expected behavior of the flour in an actual bread-type formulation. It can be appreciated that the precise mixing time needed for a sample to reach satisfactory development will be influenced by the particular leavening system employed as each system has its

[1] The shortening was composed of 85% essentially triglycerides obtained by hydrogenating a mixture of vegetable oil and rearranged lard and 15% of a vegetable oil superglycerinated to provide a mixture of about 40% monoglyceride, 40% diglyceride, and the remainder triglyceride.

peculiar speed of response. The leavening product identified above is a combination of a fast-acting acidic leavening agent, monocalcium phosphate, and a slow-acting agent, sodium aluminum sulfate, and has been found quite satisfactory. However, other known systems can be substituted, relatively slow-acting system being preferred. As is known, sodium acid pyrophosphate, sodium aluminum sulfate, glucono-delta-lactone, and monocalcium phosphate anhydrous are rated relatively slow acting.

The baking soda, i.e., sodium bicarbonate, should be present in approximately sufficient quantity to neutralize the acidic agent. In lieu of soda, an equivalent amount of potassium bicarbonate or even ammonium bicarbonate can be substituted as the gas-producing agent, although the latter is only rarely seen in bread-type recipes and tends to contribute a flavor not normally sought after in such products. For purposes of farinograph testing, the amount of the leavening system to be added is best determined with a view to what is required for good rising quality and proper texture in the ultimate product. This is important if the test results are to be consistent with the response of the actual mix. For the commercial baking powder already mentioned, 9% by weight of the flour seemed to be about optimum. The leavening action is, of course, due to the presence of the gas-producing agent, e.g., soda, which releases $CO_2$ when neutralized by one or more acidic agents. Thus, the necessary amount of leavening is best calculated with reference to the gas-producing agent. In general, the amount of gas-producing agent will fall within the range of about 1–2% by weight of the complete dough, i.e., including aqueous as well as non-aqueous ingredients, the amount of acidic agent being adjusted to provide at least substantial neutralization. For example, in the complete dough described above, the amount of soda is 1.35%, monocalcium phosphate monohydrate 0.56%, and sodium aluminum sulfate 0.95%. It was believed that an acceptable product could be made with yeast as the leavening agent, but since yeast inherently requires a lengthy rising period, there is little reason to employ this material in making mixes and/or doughs according to the invention.

The dry mixes of the present invention are prepared merely by substituting treated flour for the normal flour in the desired bread-type formulation and incorporating the leavening system in the necessary amount instead of following conventional yeast-leavening procedures. Thus, it will be seen that the particular recipe to be adopted is not of critical importance to the practice of the invention and can be established on the basis of existing knowledge in the culinary field. Customarily, bread-type products include a major amount of flour and minor amounts of such ingredients as sugar, salt, dried milk solids, whole egg or whole egg solids, and shortening, the specific combination and amounts of ingredients being dependent upon the desired ultimate product. Other constituents can, of course, be included, among which may be mentioned non-wheat flours, i.e., potato flour, soya bean flour, rye flour, etc. in minor amounts and various flavorings, as may be needed in specialty products. The type and quality of the ingredients may be as is usual in the art. Hydrogenated animal or vegetable fats alone or containing a small proportion, i.e., 5–15%, of one or more emulsifying agents are often more satisfactory than natural animal fats. The selection of appropriate emulsifying agents satisfyng government regulations applicable to products for human consumption is within the skill of the art and requires no discussion here.

In order to illustrate the variation possible for the more common ingredients in the bread-type goods, the following generic composition for the dry mix may be given.

| Ingredient: | Parts by weight |
|---|---|
| Flour | 80–120 |
| Salt for flavoring | 0.5–2.0 |
| Sugar | 0–10 |
| Non-fat dried milk solids | 0–6 |
| Shortening | 0–25 |
| Flavoring | 0–4 |
| Gas-producing leavening agent | 0–5 |
| Acidic leavening agent in sufficient amount to provide ratio relative to gas-producing agent of about 0.8–1.2:1 or an equivalent weight basis. | |

After a definite formulation has been decided upon and the necessary ingredients selected, the dry mix may be compounded using conventional equipment and techniques, packaged into suitable cartons or the like, and distributed through existing commercial channels. All that the housewife need do is add water, milk and/or egg as the case may be, according to accompanying instructions and mix manually into dough. Preferably, the amount of water so specified is that which has been found in advance by the manufacturer to give the desired development of 500 Brabender units. Mixing is continued for the few minutes needed for the dough to attain good development, the mixing time also being preferably specified in accordance with predetermined test results. An incidental advantage of the invention is the elimination of the lengthy fermentation, i.e., rising, period and repeated kneading operations necessary to the preparation of yeast-leavened dough. Doughs made from the present mixes are ready for immediate use and, indeed, suffer unless used without delay. When ready, the dough is subdivided and shaped as may be appropriate for the intended product, placed in a greased pan, and baked at the proper temperature until done.

The following specific examples will serve to further illustrate the practice of the invention:

*Example I*

To 40 pounds of Wingold flour (12.5% protein) in a mixing tank agitated by a turbine blade stirrer and having a water jacket supplied with 110° F. water was added 80 pounds of water and one tablet (3.66 gms.) Fermex MT. The resultant slurry was mixed for one hour, after which time the actual slurry temperature was 106° F., and delivered to the spray-drying tower employed in the previous example at a flow rate of 2.3 lbs./min. The inlet air temperature during drying was 350° F. and the exit air temperature, 130° F.

Using the mixing section of a farinograph, 21 gms. of the emulsified shortening of the preceding example was creamed with 21 gms. sugar and then dry-mixed with 300 gms. flour treated as above, 4.2 gms. salt, 10 gms. sodium bicarbonate, and 27 gms. glucono-delta-lactone. Next, the mixture (approximately 384 gms. total) was mixed with 190 gms. water for 5 minutes, at which point the development curve had reached an average value of 490 Brabender units. The dough was removed from the farinograph mixing chamber, scaled into 42 gms. portions, and baked for 20 minutes at 400° F. The rolls thus obtained had excellent texture and configuration and a volume of 4.14 cc./gm.

When the above procedure was repeated using hand-mixing instead of machine mixing, only 30 seconds of hand-mixing was required to give a smooth, elastic dough that could be kneaded. The final product had a volume of 3.74 gms./cc.

*Example II*

40 pounds Eaco flour (12.5% protein) was mixed with one tablet (3.66 gms.) of Fermex MT and 80 lbs. water for 2 hours at 110° F. and spray-dried with the same equipment as before at 6000 p.s.i., 3.1 lbs./min. flow rate, 350° F. inlet air temperature, and 132° F. outlet air temperature. A trial farinogram was taken of the treated flour, using 300 gms. flour and 180 gms. water, a peak of 600 Brabender units being obtained after 2.5 min. of mixing. Applying a known correction factor, it could be expected that the optimum 500 unit level would result if the water were to be increased to approximately 192 gms.

The dough-making qualities of the treated flour was tested by running a farinogram on a mixture of 250 gms. flour; 86 gms. of a pre-mix consisting of 3.8 gms. salt, 37.5 gms. sugar, 17.5 gms. dried non-fat milk solids, 5 gms. dried egg solids and 22.2 gms. "Clabber Girl" baking powder; and 180 gms. water. The development curve reached a peak of about 550 Brabender units, which peak persisted for some time, but was initially achieved after approximately 7.5 minutes of mixing.

Another batch of the treated flour was made into rolls by mixing 250 gms. flour with 86 gms. of the pre-mix as before and 180 gms. water in the mixing section of the farinograph for 5 min., after which 50 gms. of the same emulsified shortening was added and mixing continued for an additional minute. The dough was removed from the farinograph, scaled in 42 gm. portions, and baked for 20 min. at 400° F. The volume of the final rolls was 3.08 cc./gm.

I claim:
1. A proteolytic enzyme-treated hard wheat flour containing at least about 10.5% protein by weight and adapted for use in producing chemically leavened bread-type bakery products, said flour being characterized when tested in a farinograph in admixture with sufficient water to produce at a peak development of 500 Brabender units by a mixing time to achieve such development of about 1.5–4 minutes and a maximum mixing tolerance of about 5 minutes.

2. A method of treating hard wheat flour containing at least about 10.5% protein by weight to reduce its development time which method comprises the steps of:
(1) forming a slurry of said flour in at least a 50% excess by weight water,
(2) subjecting the flour while in said slurry to the action of a catalytic amount of a proteolytic enzyme for a time of about 0.5–4 hours at a temperature of about 80°–130° F., said temperature varying generally inversely with said time, and
(3) drying said slurry under conditions avoiding substantial heat-damage of the flour to restore the flour to substantially its original particulate form.

3. A method as in claim 2 wherein said amount of enzyme is within the range of about 0.001–1% by weight of the flour in said slurry.

4. A method as in claim 2 wherein said flour is spray-dried at a temperature of the exhaust air not substantially in excess of about 170° F.

5. A prepared dry mix for bread-type bakery products comprising shortening, flour and a chemical leavening agent in substantially homogeneous admixture wherein said flour is a proteolytic enzyme-treated hard wheat flour containing at least about 10.5% protein by weight, said mix being characterized when tested in a farinograph in admixture with sufficient water to give a peak development of 500 Brabender units by a mixing time of not more than about 10 minutes to reach said development.

6. A prepared dry mix for bread-type bakery products consisting of a substantially homogeneous pulverulent admixture comprising shortening, a bicarbonate salt selected from the group consisting of sodium, potassium, and ammonium bicarbonate salts, a leavening acid, and a proteolytic enzyme-treated hard wheat flour containing at least about 10.5% protein by weight, said mix being characterized when tested in a farinograph in admixture with sufficient water to give a peak development of 500 Brabender units by a mixing time of not more than about 10 minutes to reach said development.

References Cited by the Examiner

UNITED STATES PATENTS

| | | | |
|---|---|---|---|
| 1,179,877 | 4/16 | Wahl et al. | 99—90 |
| 2,808,334 | 10/57 | Battiste | 99—94 |
| 2,969,289 | 1/61 | Matz et al. | 99—94 |
| 3,096,178 | 7/63 | Tucker | 99—90 |

FOREIGN PATENTS

| | | |
|---|---|---|
| 23,361 | 1899 | Great Britain. |

OTHER REFERENCES

"Bakery Technology and Engineering," 1960, by Matz, The Avi Publishing Co., Inc. (Westport, Conn.), pp. 232, 233.

A. LOUIS MONACELL, *Primary Examiner.*

ABRAHAM H. WINKELSTEIN, RAYMOND N. JONES, *Examiners.*

UNITED STATES PATENT OFFICE
CERTIFICATE OF CORRECTION

Patent No. 3,167,432

January 26, 1965

Edward E. Colby

It is hereby certified that error appears in the above numbered patent requiring correction and that the said Letters Patent should read as corrected below.

Column 6, line 20, strike out "Manton-Gaulin"; column 11, line 33, for "1.5-4" read -- 1.5-5 --.

Signed and sealed this 10th day of August 1965.

(SEAL)
Attest:

ERNEST W. SWIDER
Attesting Officer

EDWARD J. BRENNER
Commissioner of Patents